(12) United States Patent
Bagley et al.

(10) Patent No.: US 8,131,800 B2
(45) Date of Patent: Mar. 6, 2012

(54) ATTRIBUTE VISUALIZATION OF ATTENDEES TO AN ELECTRONIC MEETING

(75) Inventors: Elizabeth Vera Bagley, Cedar Park, TX (US); Pamela Ann Nesbitt, Tampa, FL (US); David Ross, Round Rock, TX (US); Amy Delphine Travis, Arlington, MA (US); Lorin Evan Ullmann, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 419 days.

(21) Appl. No.: 12/127,155

(22) Filed: May 27, 2008

(65) Prior Publication Data
US 2008/0229216 A1    Sep. 18, 2008

Related U.S. Application Data

(63) Continuation of application No. 11/221,549, filed on Sep. 8, 2005, now abandoned.

(51) Int. Cl.
*G06F 15/16* (2006.01)
*G06F 15/173* (2006.01)

(52) U.S. Cl. ........ 709/204; 709/205; 709/206; 709/207; 709/224

(58) Field of Classification Search .................. 709/205, 709/206, 207, 224, 204
See application file for complete search history.

(56) References Cited

U.S. PATENT DOCUMENTS

| 5,002,491 | A | 3/1991 | Abrahamson et al. |
| 5,347,306 | A | 9/1994 | Nitta |
| 5,491,743 | A | 2/1996 | Shiio et al. |
| 5,793,365 | A * | 8/1998 | Tang et al. ..................... 715/758 |
| 5,880,731 | A * | 3/1999 | Liles et al. ..................... 715/758 |
| 6,208,659 | B1 * | 3/2001 | Govindarajan et al. ........ 370/410 |
| 6,230,185 | B1 | 5/2001 | Salas et al. |
| 6,330,022 | B1 * | 12/2001 | Seligmann ................. 348/14.08 |
| 6,407,743 | B1 | 6/2002 | Jones |
| 6,801,216 | B2 | 10/2004 | Voticky et al. |
| 6,826,540 | B1 | 11/2004 | Plantec et al. |
| 7,096,431 | B2 * | 8/2006 | Tambata et al. ............... 715/834 |
| 7,328,246 | B2 * | 2/2008 | Hull et al. ...................... 709/206 |
| 7,636,751 | B2 * | 12/2009 | Weaver et al. ................. 709/204 |
| 7,685,237 | B1 * | 3/2010 | Weaver et al. ................. 709/205 |

(Continued)

FOREIGN PATENT DOCUMENTS
CN    1662871 A    8/2005

OTHER PUBLICATIONS

IBM® Lotus® Sametime® 3.1: User's Guide (2003, retrieved from http://www.csom.umn.edu/ Assets/18286.pdf, pp. 1-293).*

(Continued)

*Primary Examiner* — Karen C Tang
(74) *Attorney, Agent, or Firm* — Yee & Associates, P.C.; Steven L. Bennett

(57) ABSTRACT

A server publishes a poll to one or more attendee clients to an electronic conference. The poll permits each attendee to select one of several choices as the vote of the respective attendee. Initially an attendee may have a default choice assigned to him, for example, undecided. The server may show a hypertext page that includes an image or persona icon of the attendee located within a panel that has the current vote that an attendee has chosen or, by default, been assigned.

20 Claims, 5 Drawing Sheets

U.S. PATENT DOCUMENTS

| | | |
|---|---|---|
| 7,689,649 B2 * | 3/2010 | Heikes et al. .................. 709/204 |
| 2002/0085030 A1 | 7/2002 | Ghani |
| 2002/0097251 A1 | 7/2002 | Attar et al. |
| 2004/0059781 A1 * | 3/2004 | Yoakum et al. ............... 709/204 |
| 2004/0179038 A1 | 9/2004 | Blattner et al. |
| 2005/0172001 A1 * | 8/2005 | Zaner et al. ................... 709/205 |
| 2006/0265729 A1 * | 11/2006 | Anglin, Jr. .................... 725/105 |
| 2008/0216022 A1 * | 9/2008 | Lorch et al. ................... 715/847 |
| 2010/0169801 A1 * | 7/2010 | Blattner et al. ............... 715/758 |

OTHER PUBLICATIONS

China Patent Office Action Jun. 5, 2009.

* cited by examiner

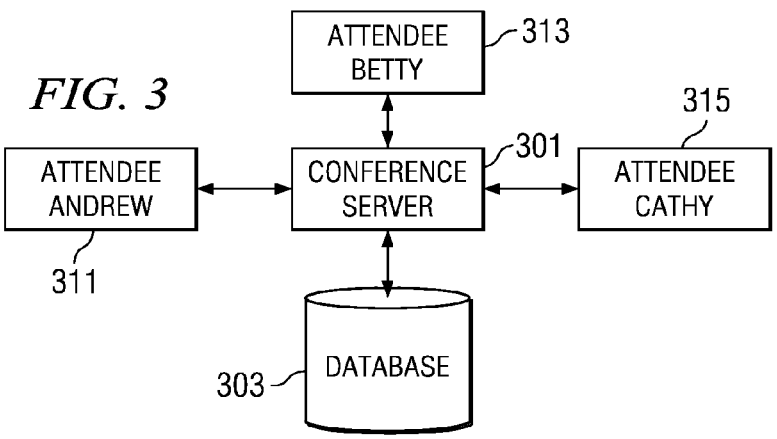
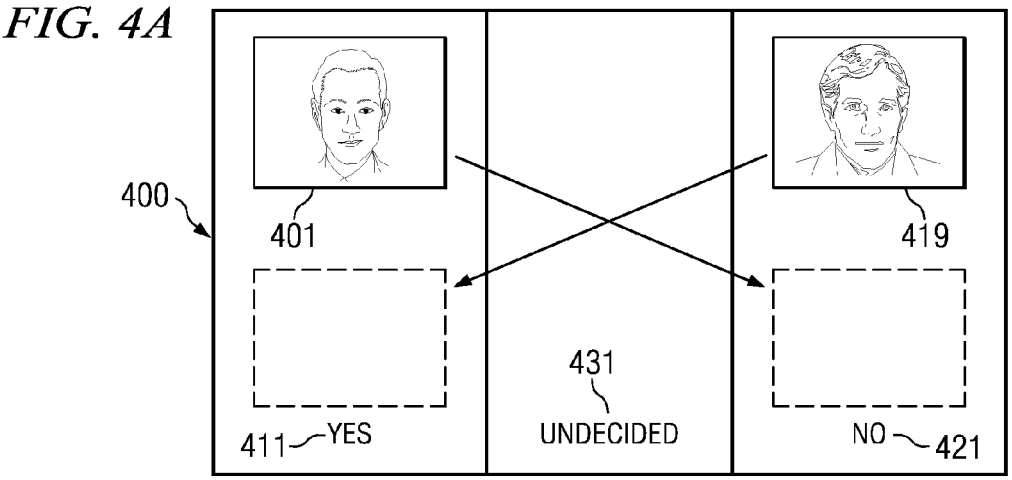
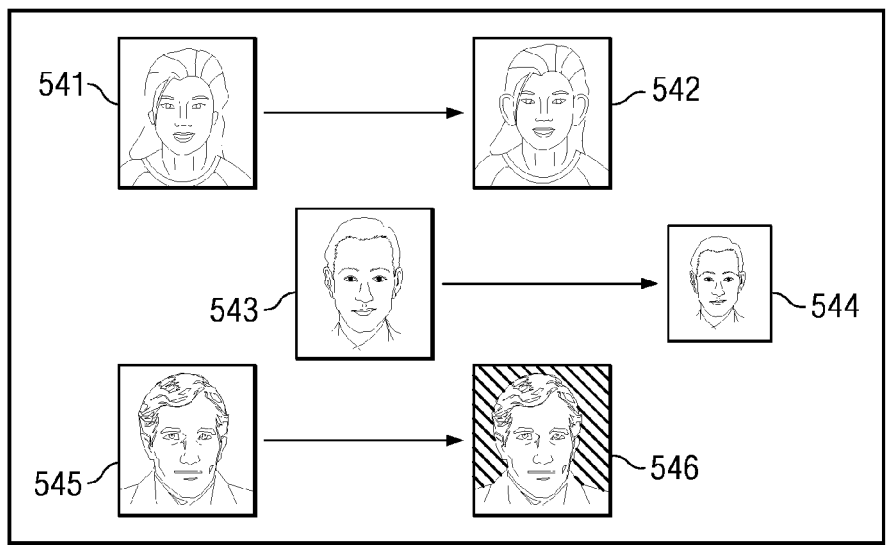

ATTRIBUTE VISUALIZATION OF ATTENDEES TO AN ELECTRONIC MEETING

This application is a continuation of application Ser. No. 11/221,549, filed Sep. 8, 2005, status pending.

BACKGROUND OF THE INVENTION

1. Field of the Invention

The present invention generally relates to visually assisted teleconferences, and more specifically to imaging the kind and extent of user inputs to a teleconference.

2. Description of the Related Art

There is an abundance of online conferencing tools. Some tools permit a visual representation of a user to be displayed, for example, a photo, on the client workstations of the user's peers that attend the electronic meeting. Often, the user's icon or persona is exchanged with peers over high-speed packet communications which now support even high-quality voice. Online conferencing, at a minimum, requires visibility among at least two people, the inputs of at least one such attendee to the online conference, wherein those inputs may be audio and video, among others.

Among the chief challenges to online conferences is maintaining the attention and interaction of all conference attendees. Attentive attendees result in faster meetings, better awareness of each person's responsibilities and preferences, and generally better satisfaction that each person can be counted on to follow through.

Unfortunately, access to applications other than the online conferencing client often distracts. Such applications may include electronic mail, web browser, and streaming media to name a few.

Some progress has occurred in recent years. For example, some collaboration tools provide photographs of participants. Other tools offer polling mechanisms. In addition, polling mechanisms generally provide both a user-input form, and a consensus results display. The user-input form may be a combination of a question and a series of options in the form of radio-buttons associated with a descriptive text, wherein a user may select and possibly confirm a choice or preference. The consensus results display may show the number of votes cast for each of the choices presented in the user-input forms.

There are many subtle cues that may be available in a face-to-face meeting or an in-office meeting that are also lost in an online conferencing environment. For example, diplomas and awards that hang in one's office do not have suitable online substitutes shown in connection with online conferencing environments. In addition, a set of attendee attributes, e.g. concerning an attendee's national origin or affiliations with relevant societies and groups is not available in online conferencing environments.

It would be advantageous to, at the outset of each meeting, perhaps as each person logs in, show static details of the attendee's seniority, origin or other unchanging details of a participant.

In addition, it would be helpful to show dynamic aspects of a participant's level of involvement in a meeting, particularly in relation to facial features. Among the aspects of involvement may be whether an attendee has voted on a poll question. Therefor, visibility as to who fails to vote is helpful.

SUMMARY OF THE INVENTION

The present invention provides a method, apparatus, and computer usable code for displaying among computers, dynamic attributes of electronic conference attendees, wherein each computer has at least one display, and each electronic conference attendee has a group display. An icon is assigned to each electronic conference attendee. User inputs may be received at a server from each electronic conference attendee. The server modifies the icon based on the user input to create a modified icon. The server may present the modified icon in at least one display associated such that each display shows each icon of each electronic conference attendee.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram illustrating the relationship of software components operating within a computer system in accordance with an illustrative embodiment of the present invention;

FIG. 4A is a display representation of icons in accordance with an illustrative embodiment of the present invention;

FIG. 5A is an asleep affect in accordance with a second illustrative embodiment of the present invention;

DETAILED DESCRIPTION OF THE PREFERRED EMBODIMENT

Figure 1:
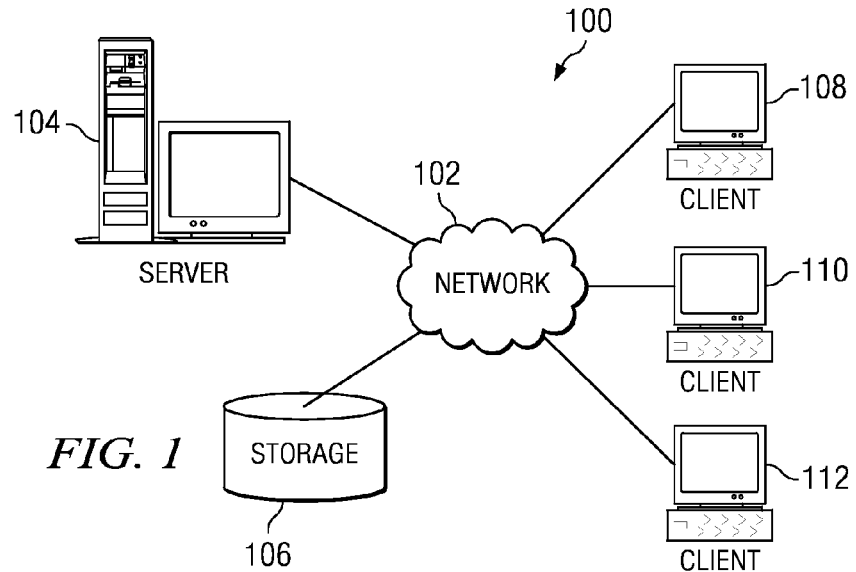
FIG. 1 is a network of data processing systems in accordance with an illustrative embodiment of the present invention.

FIG. 1 is provided as an exemplary diagram of data processing environments in which embodiments of the present invention may be implemented. It should be appreciated that FIG. 1 is only exemplary and is not intended to assert or imply any limitation with regard to the environments in which aspects or embodiments of the present invention may be implemented. Many modifications to the depicted environment may be made without departing from the spirit and scope of the present invention.

With reference now to the figures, FIG. 1 depicts a pictorial representation of a network of data processing systems in which aspects of the present invention may be implemented.

Network data processing system 100 is a network of computers in which embodiments of the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 connects to network 102 along with storage unit 106. In addition, clients 108, 110, and 112 connect to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

Figure 2:
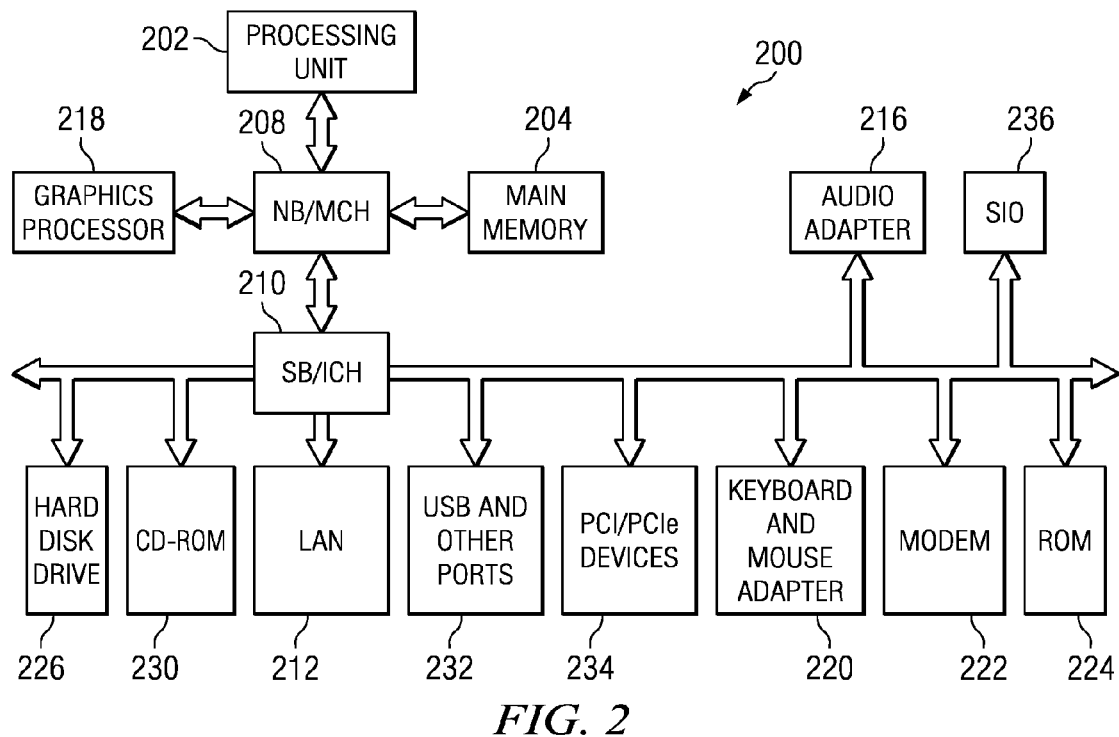
FIG. 2 is a block diagram of a data processing system in which illustrative embodiments of the present invention may be implemented.

With reference now to FIG. 2, a block diagram of a data processing system is shown in which aspects of the present invention may be implemented. Data processing system 200 is an example of a computer, such as server 104 or client 108 in FIG. 1, in which code or instructions implementing the processes for embodiments of the present invention may be located.

In the depicted example, data processing system 200 employs a hub architecture including a north bridge and memory controller hub (MCH) 208 and a south bridge and input/output (I/O) controller hub (ICH) 210. Processor 202, main memory 204, and graphics processor 218 are connected to memory controller hub 208. Graphics processor 218 may be connected to memory controller hub 208 through an accelerated graphics port (AGP), for example.

In the depicted example, local area network (LAN) adapter 212, audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to input/output controller hub 210. PCI/PCIe devices may include, for example, Ethernet adapters, add-in cards, PC cards for notebook computers, etc. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be connected to ICH 210.

An operating system runs on processor 202. Processor 202 coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object oriented programming system, such as the Java programming system, may run in conjunction with the operating system and provides calls to the operating system from Java programs or applications executing on data processing system 200 (Java is a trademark of Sun Microsystems, Inc. in the United States, other countries, or both).

As a server, the data processing system 200 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both).

Instructions for the operating system, the object-oriented programming system, and applications or programs are located on storage devices, such as hard disk drive 226, and may be loaded into main memory 204 for execution by processor 202. The processes for embodiments of the present invention are performed by processor 202 using computer implemented instructions, which may be located in a memory such as, for example, main memory 204, read only memory 224, or in one or more peripheral devices 226 and 230. These processes may be executed by any processing unit, which may contain one or more processors.

Those of ordinary skill in the art will appreciate that the hardware in FIG. 1 and FIG. 2 may vary depending on the implementation. Other internal hardware or peripheral devices, such as flash memory, equivalent non-volatile memory, or optical disk drives and the like, may be used in addition to or in place of the hardware depicted in FIG. 1 and FIG. 2. Also, the processes of the present invention may be applied to a multiprocessor data processing system.

As some illustrative examples, data processing system 200 may be a personal digital assistant (PDA), which is configured with flash memory to provide non-volatile memory for storing operating system files and/or user-generated data.

A bus system may be comprised of one or more buses, such as system buses, I/O buses and PCI buses. Of course, the bus system may be implemented using any type of communications fabric or architecture that provides for a transfer of data between different components or devices attached to the fabric or architecture. A communications unit may include one or more devices used to transmit and receive data, such as a modem 222 or local area network 212 of FIG. 2. A memory may be, for example, main memory 204 of FIG. 2. A processing unit may include one or more processors or CPUs, processor 202 of FIG. 2. The depicted examples in FIG. 1 and FIG. 2 and above-described examples are not meant to imply architectural limitations. For example, data processing system 200 also may be a tablet computer, laptop computer, or telephone device in addition to taking the form of a PDA.

A data processing system of the type depicted in FIGS. 1 and 2 may operate as a conference server such that each logged in attendee may have a representative icon appear on several attendee client displays. Moreover, each such icon may bear an indication of seniority and group affiliations of the attendee that the persona icon represents. The icon may have properties such that the icon resembles the appearance of the attendee, for example, the icon could be a persona icon. A persona icon is a digitized image of the attendee. Further, dynamic aspects of participation may be displayed in conjunction with each icon.

With reference now to FIG. 3, a block diagram illustrating how an online conference may be hosted on a conference server according to an illustrative embodiment of the present invention is shown. Conference server 301 may permit one or more attendee clients to log in to an electronic conference. Conference server 301 may support packet distribution of voice and video from one or more clients over network connections with each client. Conference server 301 may be implemented in a server such as server 104 in FIG. 1. A first attendee may be a client application used by a user, Andrew, or simply attendee client Andrew 311. A second attendee may be a client application used by a user, Betty, or simply attendee client Betty 313. A third attendee may be a client application used by a user Cathy 315. Each attendee client application, attendee Andrew 311, attendee Betty 313, and attendee Cathy 315 may be applications operating on distinct computers, such as, for example, clients 108-112 in FIG. 1. One of the client applications may be co-resident on conference server 301, such that that conference server may operate a conference host application and an attendee client application.

Conference server 301 may access database 303. Database 303 may store information concerning attendees, which may be looked up with reference to a login identifier of each attendee. Table 1 shows sets of static attendee attributes that may be applicable to attendees, Andrew, Betty, and Cathy. Database 303 may be implemented in, for example, storage unit 106 in FIG. 1.

TABLE 1

| Login identifier | Title | National Origin |
| --- | --- | --- |
| Andrew | Summer Intern | USA |
| Betty | Associate | United Kingdom |
| Cathy | Partner | Japan |

FIG. 4A depicts an exemplary display representation of icons in accordance with an illustrative embodiment of the present invention. FIG. 4A may be a panel or window group display 400 in an interface of a display for an attendee to an electronic conference in-progress. The display may be attached to, for example, graphics processor 218 of FIG. 2. Additional windows may provide a graphical user interface that permits a user of data processing system 200 to interact and contribute to the online conference. Such windows may be distinct from group display 400, or may be integrated with group display 400 as single window.

A graphical user interface may provide an input text box for notes to be passed among participants. Graphical user interface may permit 'child' windows or pop-ups to be displayed for specialty inputs. The specialty inputs may include a poll composing facility. The facility may prompt a poll author to post a question and two or more choice options for users to select. The facility may permit one or more attendees to publish a poll having the ability to display the question and each option to all attendees logged in to an electronic conference.

A server adds an additional feature that receives, from each attendee client, choices. The server moves a respondent's icon, for example, a persona icon, to a window, or an area of a window, that bears a legend corresponding to the choice made by that respondent. For example, an attendee, who may be a poll author, may post a poll in the form of "Does IBM make the best computers?", and provide for two choices, "yes" and no The server may show a clearly delineated panel that has the legend "yes" 411 and another clearly delineated panel that has the legend "no" 421. As a convenience, a further panel may be described by the server having the legend "undecided" 431. This additional panel may diminish biases introduced by having a default vote. Each user may provide a user vote input and change votes, selecting one choice at a time. The server may move the persona icon of the voter to the panel that bears the legend corresponding to a user vote input received at the server.

It is appreciated that by stating that the server "shows" or "moves" items on a display, such activities may be accomplished by transmitting hypertext markup language (HTML) or other markup language from server to client that may be rendered or otherwise depicted using a browser hosted by the client. Alternatively, the server may simply be giving placement instructions or rendering instructions to the client that may include references to image files that may or may not be stored local to the server. In addition, a session may be established between server and corresponding attendee client wherein, via conventional protocols, commands may be given to, for example, a Java-supporting client to move or otherwise change the items shown on the attendee client.

FIG. 4A, for example, depicts that attendee client Andrew may have formerly voted "yes", but changed his mind to vote "no". The server may receive a user vote input in the form of a keystroke or a movement of a pointing device from the attendee Andrew client. Thus the server would sense a state change in Andrew's voting preference and move the Andrew icon 401 from the panel bearing the "yes" legend 411 to the panel bearing "no" legend 421, wherein the Andrew icon 401 may be a persona icon. Similarly, Betty may have formerly voted "no" but changed her mind to vote "yes". Thus the server would move, within the interface of the display, the Betty persona icon 419 from the panel bearing "no" legend 421 to the panel bearing "yes" legend 411.

Attendee client Andrew may have a persona icon 401 for which he has voted or chosen a "yes" response to a published poll. As such, a client, for example, attendee client Betty may receive such a vote and display accordingly the persona icon of Andrew to a panel bearing "yes" legend 411.

Figure 4B:
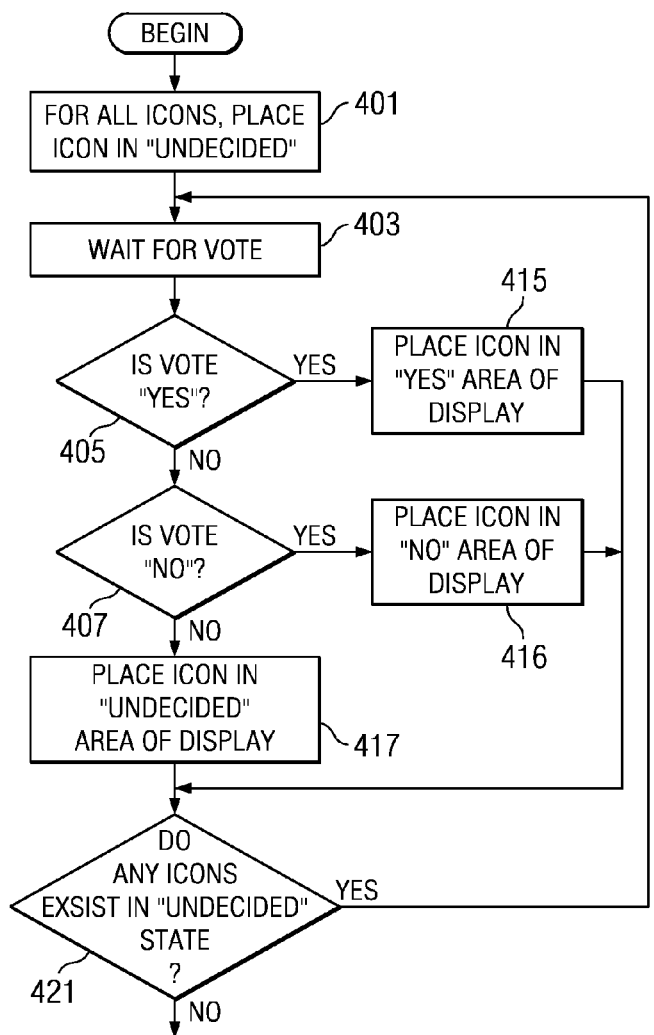
FIG. 4B is the steps that may operate to make dynamic changes to icon locations corresponding to votes in accordance with an illustrative embodiment of the present invention.

FIG. 4B shows processing that may operate to make dynamic changes to icon locations corresponding to votes. The steps of FIG. 4B may, for example, be executed by data processing system 200 of FIG. 2. The steps of FIG. 4B represent the steps taken after a poll has been published. Publishing a poll includes rendering at each client, a poll questionnaire, and rendering the several panels with legends, for example, "yes", no and "underlined". Rendering is possible because the server transmits the poll details and the icon positions to each logged-in attendee client. Initially, the server may position the set of icons in a panel having an "undecided" legend. More specifically, the icons may be persona icons.

In general, the steps of FIG. 4B show how a server receives changes in dynamic state of each participant, and then distributes the change in state to the logged-in clients in the form of movement or relocation of distinct icons to panels that correspond to that state, or in this case, the voting attribute.

Initially the server assigns all attendee clients an initial state, in this example, the state is "undecided" (step 401). The server may transmit a web page that shows panels each with a legend, and populated with persona icons accordingly. There is one icon for each logged-in attendee client, and the server may transmit the same web page to each logged-in attendee client. All icons that are associated with a logged-in attendee client comprise a set of icons.

A user at an attendee client may make a vote using a poll displayed on her computer. The server may receive the client input from the attendee client, wherein the input denotes a user choice (step 403). The server determines which among the choices, "yes", "no" or "undecided" the attendee client has chosen. If the server received a "yes" choice, a "yes" outcome occurs from the test "is vote 'yes'?" (step 405). If a "no" choice was received, a positive branch is taken from the test "is vote 'no'?" (step 407). If neither a "yes" nor a "no" choice was received, then execution leaves step 407 and the server may place the persona icon associated with the attendee client in an "undecided" legended area of the display (step 417). Once the conference server takes the "yes" branch of step 405, the server places the icon in the "yes" area of the display (step 415). If the "yes" branch of step 407 is taken, the server places the icon in the "no" area of the display (step 416). The server may track the current votes of each attendee client by storing a vote associated with each attendee client at a convenient data structure.

In each case, the placing of the icon may involve two phases: modifying a persona icon associated with the attendee client; and transmitting the persona icon associated with the attendee client to each client among the set of logged-in attendee clients whereby a set of modified icons is presented. Modifying the persona icon may involve the server creating a markup language file containing instructions. The instructions may describe where to place the persona icon among the legends of the window at the client display. Transmitting the persona icon may be sending a markup language file across a network that links the server to each client. Instructing the client computer includes the steps of creating a markup language file with placement instructions associated with respective icons and sending the file.

The server may check to see if any attendee clients continue to be associated with a default status, in this example, "undecided" (step 421). If the result is "yes", processing may iterate, going next to step 403. Otherwise, the attendees may be finished voting, and the process ends. Those who have already voted may thus clearly see who has not voted, and apply pressure accordingly.

To liven up a meeting, a collection of persona icons belonging to those who vote the same may be morphed together. To enhance the morphing process coordinates of key facial features may be stored along with the persona icon. Coordinates may include the corners of eyes and mouths. Morphing among several persona icons may involve the processor mapping the coordinates of a feature to a common location in a morphed image.

FIG. 5A shows an asleep affect in accordance with a second illustrative embodiment of the present invention. The steps may provide a way to see which attendees maintain a level of activity within the electronic conferencing environment. Activity, in the form of user inputs, may take many forms in a meeting administered by the server. Activity may be measured by the frequency of comments offered in the form of keyboard entered messages from an attendee. Activity may be measured by the frequency of detecting a certain voice level in streaming media originating from a client. That is, the occurrence of an attendee speaking. Activity may be measured by the frequency that the user moves a pointer within the application of the electronic conference as displayed on the attendee's client. Thus activity, as measured at the server, may be measuring the occurrence of a certain quality in streaming input arriving from the client, for example a loud voice. Alternatively, activity, as measured at the server, may be measuring the occurrence of more episodic input, such as a transmittal of a short text message.

When an attendee logs in to the server, the server may assign the attendee a persona icon that facilitates display of a state of attentiveness, for example, a version of the persona icon that connotes an "awake" behavior by the attendee. Awake is a general term that describes the level of recent activity that an attendee has made in relation to the electronic conference. At the simplest level, there may be two versions of the persona icon that denotes states of attentiveness. One state may be a normal digital image of the attendee, and second state may be, an exaggerated change to the normal digital image. Alternatively, there may be a range of persona icon versions that denote, incrementally, many levels of attentiveness. Each version of the attendee's persona icon may be stored in a database. The database may be, for example, database 303, of FIG. 3.

FIG. 5A shows three ways that an attendee's current icon, for example, a persona icon may change to at least a second version that signals a less wakeful interaction by the attendee thus depicting an inattentive user state. Persona icon 541 may be an awake version of the persona icon reflecting an attentive user state. However, the attendee to which persona icon 541 is assigned may not be speaking sufficiently, and the server may assign to the attendee an inattentive user state, wherein the server may depict an asleep persona icon version 542 in order to depict an inattentive user state. Asleep persona icon version 542 may have a humorous enlargement of the ears to highlight the new user state.

Further embodiments may utilize additional alterations to depict an inattentive user state. Persona icon 543 may be an awake version of the persona icon. However, the attendee to which persona icon 543 is assigned may not be speaking sufficiently, and the server may assign to the attendee an asleep persona icon version 544, which may be a reduced size version of the persona icon. Persona icon 545 may be an awake version of the persona icon. However, the attendee to which persona icon 545 is assigned may not be speaking sufficiently, and the server may assign to the attendee an asleep persona icon version 546, which may have some aspects of the image darkened. It is appreciated that there may be many intermediate versions that show finer gradations of activity between each of the examples shown. In addition, many alternative changes may be made to depict awake and asleep, including intermediate changes when morphing a digital image to another.

It is appreciated that the connotation of asleep may alternatively mean attentive, but not contributing. Enlarging ears may be a way to embarrass a user into more activity. However, an equally valid configuration could be just the opposite, wherein a convention is adopted that those whom are falling asleep have either the ears diminishing or the eyes closing or both.

Figure 5B:
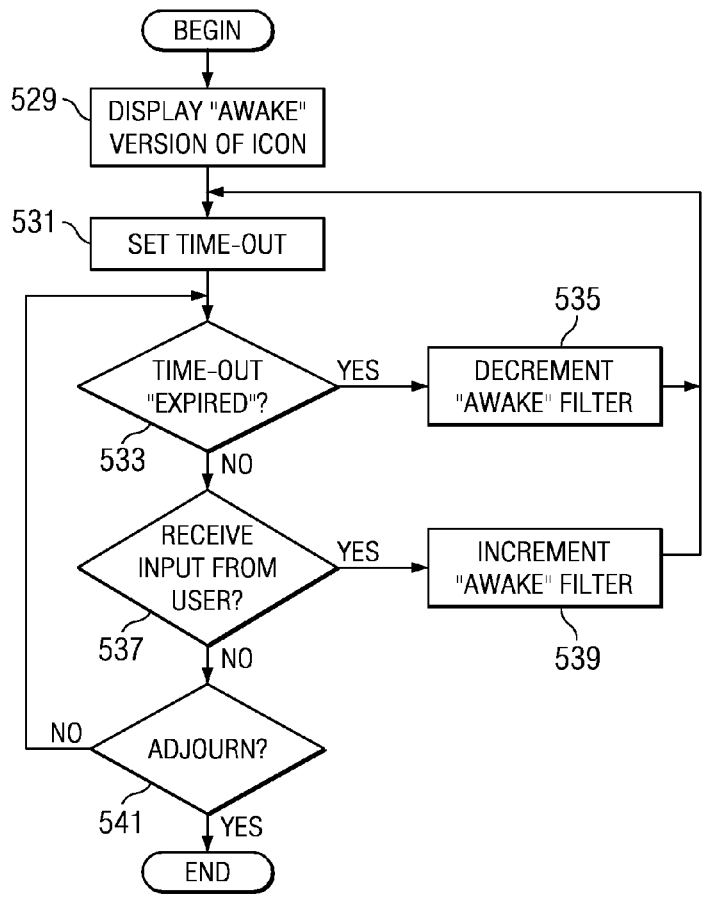
FIG. 5B is the steps a processor may use to change the icon that is assigned to an attendee in accordance with an illustrative embodiment of the present invention.

FIG. 5B shows the steps a processor may use to change the icon that is assigned to an attendee. A first step is to assign a default persona icon to each attendee, which may be the most wakeful version of the icons among a set of icons that may be assigned to an attendee (step 529). The icons may be persona icons. The set of persona icons to which an attendee may be assigned may be stored in a database, for example, database 303 of FIG. 3. A time-out interval may be set by setting a time-out counter (step 531). The time-out may be a predetermined amount of time that denotes the time that each attendee may passively observe the electronic conference before the attendee's persona icon is adjusted to reflect a more inattentive user state. The adjustment may be the applying of an image filter to impart a graphic effect to the ordinary persona icon. A time-out may be on the order of a minute. Periodically, the processor will determine if the time-out period has expired (step 533). If so, the processor may decrement the image filter that produces the awake effect (step 535). Alternatively, the processor may increment an image filter that produces an asleep effect. Still another alternative is that the processor may select a more asleep version of the persona icon assigned to the attendee.

The processor may receive an input from the client the attendee is using, as denoted by test to see if input received from user (step 537). When the "yes" branch is taken, processor will increment the awake filter (step 539). The incrementing of the awake filter may simply replace the version of the persona icon that is currently used, and replace the version with the default persona icon.

Eventually, the processor detects that the meeting adjourns (step 541), with the process terminating thereafter. Failing adjourning, the processor may again test to see if the time-out has expired for the particular attendee (step 533).

When the processor adjusts the filter that gives an awake or an asleep effect to an attendee's persona icon, the processor follows the step by repeating the setting of the time-out (step 531) applicable to the attendee.

Figure 6B:
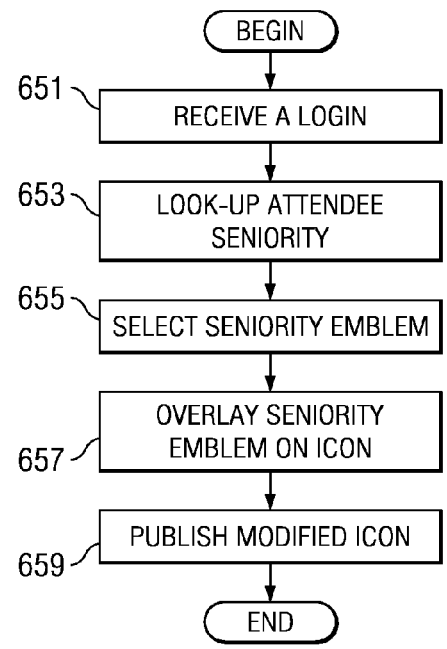
FIG. 6B is the steps to display or publish an icon modified to include a seniority emblem in accordance with an illustrative embodiment of the present invention.
Figure 6A:
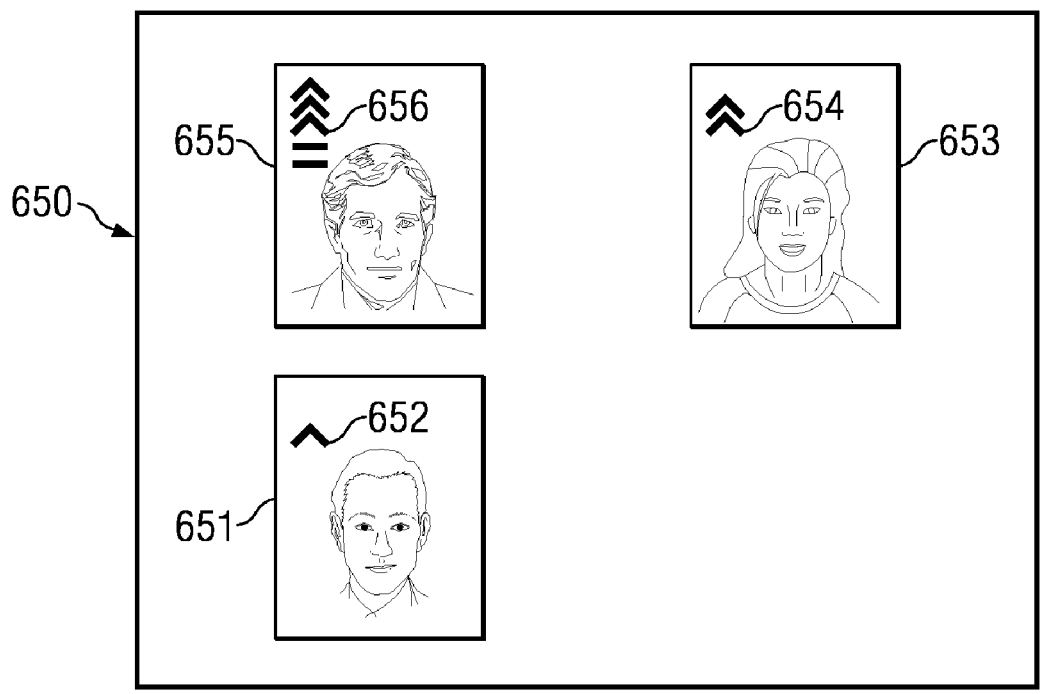
FIG. 6A is a client window showing attendees with associated seniority emblems in accordance with an illustrative embodiment of the present invention.

FIG. 6A is a client window 650 showing attendees with associated indicia of seniority in accordance with an illustrative embodiment of the present invention. Client window 650 may be an interface of a display associated with at least one of the computers running an attendee client. An indicia of seniority may be a seniority emblem, that is, an image independent of a persona icon, for example, a digitized image of chevrons. Indicia of seniority may be a transformation or morphing of a persona icon to accentuate one or more features of the persona icon. Attendee Andrew is a low ranking attendee. His persona icon 651 may be modified to include a low seniority attribute graphic, for example, a chevron 652.

A conference server may modify attendee Betty's persona icon 653 to include a mid-level seniority graphic, for example, multiple chevrons 654.

A conference server may modify attendee Cathy's persona icon 655 to include a high ranking seniority attribute graphic, for example, many chevrons 656. It is appreciated that many other symbols or graphics may be used to denote seniority, such as, for example, colored belts.

FIG. 6B shows steps to display or publish an icon modified to include a seniority emblem in accordance with an illustrative embodiment of the present invention. An icon may be a persona icon. A conference server may receive a login (step 651). The login may comprise a packet or message that an attendee has logged in (step 651). The message may include a unique attendee identifier, for example, a login identifier.

Next, a conference server may look up or locate a static attribute emblem. A static attribute emblem is any graphic representing an attribute of a person, wherein the attribute is unlikely to change during the duration of an online conference. Such attributes include, but are not limited to, country of origin, professional society membership, religious affiliation, medical condition, school alumni status, favorite team, and the like. In the case of FIG. 6B the static attribute emblem may be a seniority attribute graphic associated with the unique attendee identifier. The lookup may be accomplished by using a database-stored table, such as table 1, herein (step 653). The database may be, for example, database 303 of FIG. 3. If a database is unavailable, or there is invalid or default information contained in a database record associated with the unique attendee identifier, the conference server may prompt the attendee through a series of exchanged files or messages with the attendee client. The prompt may cause the conference server to receive an attribute from the attendee client as a part of looking-up the static attribute emblem. In this case, the attribute may be a seniority designation. The seniority designation may be text, for example, the word "partner". Alternatively, the seniority designation may be a digitalized image in any conventional storage format, for example, joint photographic experts group (JPEG).

Since the seniority designation or seniority attribute obtained in step 653 may be merely text, conference server may select a seniority emblem, for example, from a repository of digital images (step 655). Conference server may then combine or overlay the selected seniority emblem on the attendee's persona icon (step 657). The step may create a base persona icon.

Conference server may publish the base persona icon by transmitting a reference to the persona icon storage to one or more attendee clients (step 659). Publishing may include transmitting the modified persona icon to one or more of the attendee client's computers.

Alternatively, rather than publish, a server may apply a seniority emblem according to the browsing preferences of an attendee. In other words, an attendee may have a cultural preference to see belt colors instead of chevrons. Attendee may indicate such a preference to the conference server. The conference server may select a seniority emblem from a set of digital images that suit the tastes of that particular attendee, and customize each persona icon according to each attendees browser preferences.

Conference server optionally may create a set of persona icons that may be assigned to an attendee, for example, as used to select versions of attendee persona icons as in FIG. 5B.

A processor may also denote seniority by age-progression, wherein a new-hire with little experience may have a minimal age-progression enhancement to his stock persona icon. On the other hand, a veteran may be fully age-progressed. Police and public welfare agencies have used age progression for years to estimate the current appearance of abducted youngsters. An illustrative way that may accomplish age progression of a persona icon is to permit an attendee during the login process to select an aged human face with which his persona icon will be morphed to an extent correlating with his years of experience. To give a more pleasing version of age progression, the attendee may choose from a table, for example, table 2 the face to serve as the destination morph. Choices may be ad hoc, or stored in a database for later retrieval in additional electronic conferences.

TABLE 2

| | |
|---|---|
| 1. female Asian short-haired | 2. male Asian short-haired |
| 3. female Asian long-haired | 4. male Asian long-haired |
| 5. female Hispanic short-haired | 6. male Hispanic short-haired |
| 7. female Hispanic long-haired | 8. male Hispanic long-haired |

Alternatively, a processor may identify eye features and apply a varying level of sagging of the lower eyelid to suggest increased age, and thus seniority. Still a further alternative may be for a processor to identify a nasal-labial fold and increase the darkness of such a feature.

Figure 7B:
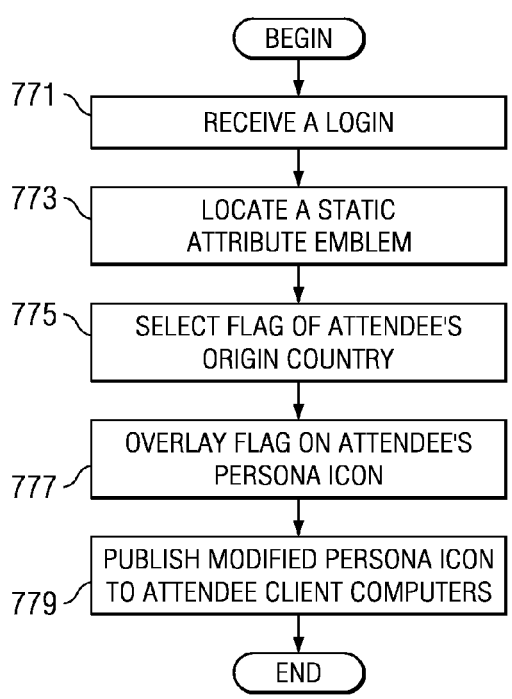
FIG. 7B is the steps to display or publish an icon modified to include a group affiliation in accordance with an illustrative embodiment of the invention.
Figure 7A:
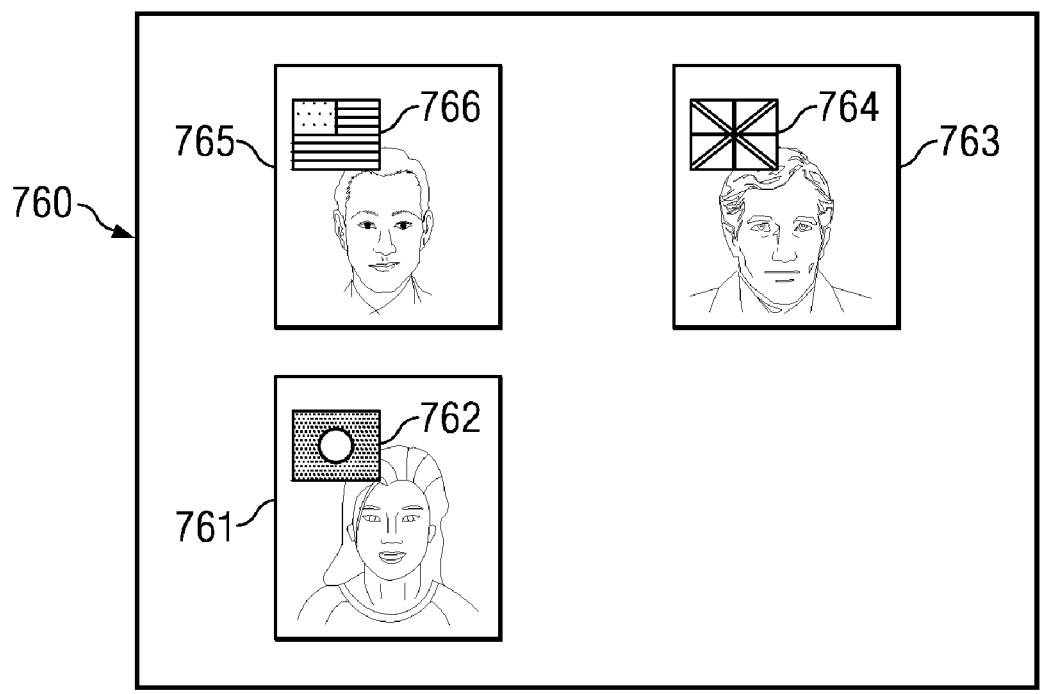
FIG. 7A is a client window showing attendees with associated origin emblems in accordance with an illustrative embodiment of the present invention.

FIG. 7A is a client window 760 showing attendees with associated indicia of group membership or origin in accordance with an illustrative embodiment of the present invention. Indicia of origin may be an origin emblem, that is, an image independent of a persona icon, for example, a digitalized image of a flag. Attendee Andrew may be from Japan. A conference server may modify his persona icon 761 to include an origin emblem, for example, a national flag of Japan 762.

A conference server may modify attendee Betty's persona icon 763 to include a flag of Great Britain 764, provided Betty is from Great Britain.

A conference server may modify attendee Cathy's persona icon 765 to include a flag of the United States of America 766, provided Cathy is from the United States of America.

The static attributes of an attendee's seniority and group affiliation may be stored within a database. In addition, an attendee in connection with logging-in to an electronic conference may provide such information.

FIG. 7A is a client window 760 showing attendees with associated origin emblems in accordance with an illustrative embodiment of the present invention. Attendee Andrew may be from Japan. A conference server may modify his persona icon 761 to include a national flag of Japan 762.

A conference server may modify attendee Betty's persona icon 763 to include a flag of Great Britain 764, provided Betty is from Great Britain.

A conference server may modify attendee Cathy's persona icon 765 to include a flag of the United States of America 766, provided Cathy is from the United States of America.

The static attributes of an attendee's seniority and group affiliation may be stored within a database. In addition, an attendee in connection with logging-in to an electronic conference may provide such information.

FIG. 7B shows steps to display or publish an icon modified to include a group affiliation in accordance with an illustrative embodiment of the present invention. An icon may be a persona icon. A conference server may receive a login (step 771). The login may comprise a packet or message that an attendee has logged in (step 771). The message may include a unique attendee identifier, for example, a login identifier.

Next, a conference server may look up a static attribute emblem. The conference server may lookup the origin of the attendee (step 773). Such a lookup may occur by using a database-stored table, such as table 1, and the origin may be either text or a graphic, which may be a static attribute emblem. The database may be, for example, database 303 of FIG. 3. If a database is unavailable, or there is invalid or default information contained in a database record associated with the unique attendee identifier, the conference server may prompt the attendee through a series of exchanged files or messages with the attendee client. The prompt may cause the conference server to receive a group affiliation designation from the attendee client as a form of looking-up the static attribute emblem, in this case, attendee group affiliation.

Since the origin may be merely text, conference server may locate a group affiliation emblem, for example, by selecting a flag of the attendee's origin country (step 775). A flag may be a kind of static attribute emblem. Conference server may then combine or overlay the selected group affiliation emblem, for example, a flag, on the attendee's persona icon (step 777). The overlay step may create a base persona icon. The conference server may publish the base persona icon by transmitting a reference to the persona icon storage to one or more attendee clients. Publishing may include transmitting the modified persona icon to one or more of the attendee client's computers (step 779).

Conference server optionally may create a set of persona icons. The conference server may assign the set of persona icons to an attendee, for example, as used to select versions of attendee persona icons as in FIG. 5B.

Thus, one or more illustrative embodiments of the present invention may permit each attendee to more visibly obtain credit for voting and other participation. Moreover, persona icons of each attendee may carry decorations, emblems and other indicia of seniority and group membership to heighten an awareness of each person's role as they interact in the electronic conference.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for displaying dynamic attributes of electronic conference attendees, the computer implemented method comprising:

assigning a persona icon to each attendee client of a plurality of attendee clients of an electronic conference to form a set of persona icons, wherein each of the set of persona icon includes a digitized image of a corresponding attendee client and a static attribute emblem of the corresponding attendee client, wherein the static attribute emblem is a seniority emblem of the corresponding attendee client, wherein each persona icon is an awake persona icon;

for each of the plurality of attendee clients, identifying one of a set of cultural preferences for displaying the seniority emblem according to browsing preferences of each of the plurality of attendee clients, and displaying the set of persona icons to the corresponding attendee client according to the identified one of the set of cultural preferences for displaying the seniority emblem;

receiving user inputs from respective computers associated with each of the attendee clients in the plurality of attendee clients;

modifying at least one persona icon in the set of persona icons based on the user inputs for an attendee client associated with the each persona icon to create a set of modified persona icons based on user state, wherein each of the set of modified persona icons is an exaggerated change to the corresponding persona icon, wherein the modified persona icon is an asleep modified persona icon, and wherein the user state is based on a level of participation in the electronic conference; and presenting the set of modified persona icons in an interface of a display associated with at least one of the respective computers, wherein the interface will display a state of attentiveness of the plurality of attendee clients.

2. The computer implemented method of claim 1 wherein modifying comprises:

determining that a predetermined amount of time has elapsed without receiving a user input from a respective attendee client; and modifying a respective persona icon in the set of persona icons associated with the respective attendee client to create a modified persona icon in the set of modified persona icons in which the modified persona icon depicts an inattentive user state.

3. The computer implemented method of claim 1 further comprising:

publishing a poll to an associated respective computer of each attendee client.

4. The computer implemented method of claim 3 wherein the receiving step further comprises receiving user inputs representative of a vote on the poll; and wherein the modifying step further comprises:

modifying the set of persona icons to indicate the voting attributes of the plurality of attendee clients.

5. The computer implemented method of claim 4, wherein the set of persona icons are modified by associating placement instructions with the respective persona icons to cause an attendee client computer to render the respective persona icons in a respective panel associated with a voting attribute.

6. The computer implemented method of claim 1, further comprising:

receiving a login from a first attendee client, the login comprising at least one message having a unique attendee identifier;

locating a set of static attendee attributes associated with the unique attendee identifier; and modifying a respective persona icon in the set of persona icons associated with the unique attendee identifier, wherein the respective persona icon is modified to depict attendee attributes.

7. The computer implemented method of claim 6, wherein the modified persona icon has an indicia of group membership.

8. The computer implemented method of claim 6, wherein the modified persona icon has an indicia of seniority.

9. The computer implemented method of claim 1 wherein a session leader may utilize the interface to identify respective attendee clients who are not engaged in interactive portions of the electronic conference and to encourage their participation.

10. A computer program product comprising a non-transitory computer usable medium having computer usable program code for displaying among computers, attributes of electronic conference attendees, wherein each computer has at least one display, and each electronic conference attendee has a group display, said computer program product including;

computer usable program code for assigning a persona icon to each attendee client of a plurality of attendee clients of an electronic conference to form a set of persona icons, wherein each of the set of persona icon includes a digitized image of a corresponding attendee client and a static attribute emblem of the corresponding attendee client, wherein the static attribute emblem is a seniority emblem of the corresponding attendee client, wherein each persona icon is an awake persona icon;

computer usable program code, for each of the plurality of attendee clients, for identifying one of a set of cultural preferences for displaying the seniority emblem according to browsing preferences of each of the plurality of attendee clients, and displaying the set of persona icons to the corresponding attendee client according to the identified one of the set of cultural preferences for displaying the seniority emblem computer usable program code for receiving user inputs from respective computers associated with each of the attendee clients in the plurality of attendee clients;

computer usable program code for modifying at least one persona icon in the set of persona icons based on the user inputs for an attendee client associated with the each persona icon to create a set of modified persona icons based on user state, wherein each of the set of modified persona icons is an exaggerated change to the corresponding persona icon, wherein the modified persona icon is an asleep modified persona icon, and wherein the user state is based on a level of participation in the electronic conference; and computer usable program code for presenting the set of modified persona icons in an interface of a display associated with at least one of the respective computers, wherein the interface will display a state of attentiveness of the plurality of attendee clients.

11. The computer program product of claim 10 wherein computer usable program code for modifying comprises:

computer usable program code for determining that a predetermined amount of time has elapsed without receiving a user input from a respective attendee client; and computer usable program code for modifying a respective persona icon in the set of persona icons associated with the respective attendee client to create a modified persona icon in the set of modified persona icons in which the modified persona icon depicts an inattentive user state.

12. The computer program product of claim 10 further comprising:

computer usable program code for publishing a poll to an associated respective computer of each attendee client.

13. The computer program product of claim 12 wherein the computer program product for receiving further comprises:

computer usable program code for receiving user inputs representative of a vote on the poll; and wherein the computer usable program code for modifying further comprises:

computer usable program code for modifying the set of persona icons to indicate the voting attributes of the plurality of attendee clients.

14. The computer program product of claim 13 wherein the set of persona icons are modified by associating placement instructions with the respective persona icons to cause an attendee client computer to render the respective persona icons in a respective panel associated with a voting attribute.

15. The computer program product of claim 10, further comprising:

computer usable program code for receiving a login from a first attendee client, the login comprising at least one message having a unique attendee identifier;

computer usable program code for locating a set of static attendee attributes associated with the unique attendee identifier; and computer usable program code for modifying a respective persona icon in the set of persona icons associated with the unique attendee identifier, wherein the respective persona icon is modified to depict attendee attributes.

16. A data processing system comprising:
a bus;
a storage device connected to the bus, wherein computer usable code is located in the storage device;
a communication unit connected to the bus;
a processing unit connected to the bus, wherein the processing unit executes the computer usable code to
assign a persona icon to each attendee client of a plurality of attendee clients of an electronic conference to form a set of persona icons, wherein each of the set of persona icon includes a digitized image of a corresponding attendee client and a static attribute emblem of the corresponding attendee client, wherein the static attribute emblem is a seniority emblem of the corresponding attendee client, wherein each persona icon is an awake persona icon;
for each of the plurality of attendee clients, identify one of a set of cultural preferences for displaying the seniority emblem according to browsing preferences of each of the plurality of attendee clients, and displaying the set of persona icons to the corresponding attendee client according to the identified one of the set of cultural preferences for displaying the seniority emblem;
receive user inputs from respective computers associated with each of the attendee clients in the plurality of attendee clients;
modify at least one persona icon in the set of persona icons based on the user inputs for an attendee client associated with the each persona icon to create a set of modified persona icons based on user state, wherein each of the set of modified persona icons is an exaggerated change to the corresponding persona icon, wherein the modified persona icon is an asleep modified persona icon, and wherein the user state is based on a level of participation in the electronic conference; and
present the set of modified persona icons in an interface of a display associated with at least one of the respective computers, wherein the interface displays a state of attentiveness of the plurality of attendee clients.

17. The data processing system of claim 16 wherein the processing unit further executes the computer usable code to publish a poll to an associated respective computer of each attendee client.

18. The data processing system of claim 17 wherein executing the computer usable code to receive the processing unit further executes the computer usable code to receive user inputs representative of a vote on the poll; and wherein the computer usable code to modify further comprises:
computer usable code to modify the set of persona icons to indicate the voting attributes of the plurality of attendee clients.

19. The data processing system of claim 18 wherein the set of persona icons are modified by associating placement instructions with the respective persona icons to cause an attendee client computer to render the respective persona icons in a respective panel associated with a voting attribute.

20. The data processing system of claim 16 wherein the processing unit further executes the computer usable code to receive a login from a first attendee client, the login comprising at least one message having a unique attendee identifier;
locate a set of static attendee attributes associated with the unique attendee identifier; and
modify a respective persona icon in the set of persona icons associated with the unique attendee identifier, wherein the respective persona icon is modified to depict static attendee attributes.

* * * * *